US010596858B2

(12) United States Patent
Iwabuchi

(10) Patent No.: US 10,596,858 B2
(45) Date of Patent: *Mar. 24, 2020

(54) PNEUMATIC TIRE

(71) Applicant: BRIDGESTONE CORPORATION, Chuo-ku, Tokyo (JP)

(72) Inventor: Sotaro Iwabuchi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 15/519,555

(22) PCT Filed: Oct. 6, 2015

(86) PCT No.: PCT/JP2015/078384
§ 371 (c)(1),
(2) Date: Apr. 17, 2017

(87) PCT Pub. No.: WO2016/067855
PCT Pub. Date: May 6, 2016

(65) Prior Publication Data
US 2017/0240003 A1    Aug. 24, 2017

(30) Foreign Application Priority Data

Oct. 27, 2014    (JP) .................................. 2014-218553
Oct. 27, 2014    (JP) .................................. 2014-218554

(51) Int. Cl.
*B60C 13/02* (2006.01)
*B60C 13/00* (2006.01)

(52) U.S. Cl.
CPC .............. *B60C 13/02* (2013.01); *B60C 13/00* (2013.01); *B60C 13/002* (2013.01)

(58) Field of Classification Search
CPC ..... B60C 13/00; B60C 13/001; B60C 13/002; B60C 13/003; B60C 13/02; B60C 13/023
See application file for complete search history.

(56) References Cited

U.S. PATENT DOCUMENTS

| 2012/0273101 | A1 | 11/2012 | Iwabuchi |
| 2015/0314652 | A1 | 11/2015 | Iwabuchi |
| 2015/0314653 | A1 | 11/2015 | Iwabuchi |

FOREIGN PATENT DOCUMENTS

| CN | 102612440 A | 7/2012 |
| DE | 102012104890 A1 | 12/2013 |

(Continued)

OTHER PUBLICATIONS

Search Report of the Chinese office action dated Aug. 14, 2018, from the SIPO in a Chinese patent application corresponding to the instant patent application.

(Continued)

*Primary Examiner* — Justin R Fischer
(74) *Attorney, Agent, or Firm* — Solaris Intellectual Property Group, PLLC

(57) ABSTRACT

First direction ridge patterns and second direction ridge patterns are lined-up alternately at a tire side portion. Plural main ridges 22A through 22D and sub-ridges 26A through 26D, which project-out from a bottom surface 18A, are formed at a first direction ridge pattern 20. The respective ridges are disposed in parallel such that ridge extending directions are a same direction. Light reflection patterns are different at a main ridge region 24 and a sub-ridge region 28.

9 Claims, 14 Drawing Sheets

(56) References Cited

FOREIGN PATENT DOCUMENTS

| | | |
|---|---|---|
| EP | 2502758 A1 | 9/2012 |
| JP | H11-291722 A | 10/1999 |
| JP | 2003-320818 A | 11/2003 |
| JP | 2010-52585 A | 3/2010 |
| JP | 2011-116306 A | 6/2011 |
| JP | 2011-225026 A | 11/2011 |
| JP | 2014-162447 A | 9/2014 |

OTHER PUBLICATIONS

International Search Report issued in International Application No. PCT/JP2015/078384 dated Nov. 24, 2015.
Extended European Search Report dated Sep. 29, 2017, issued in corresponding EP Patent Application EP 15854982.4.

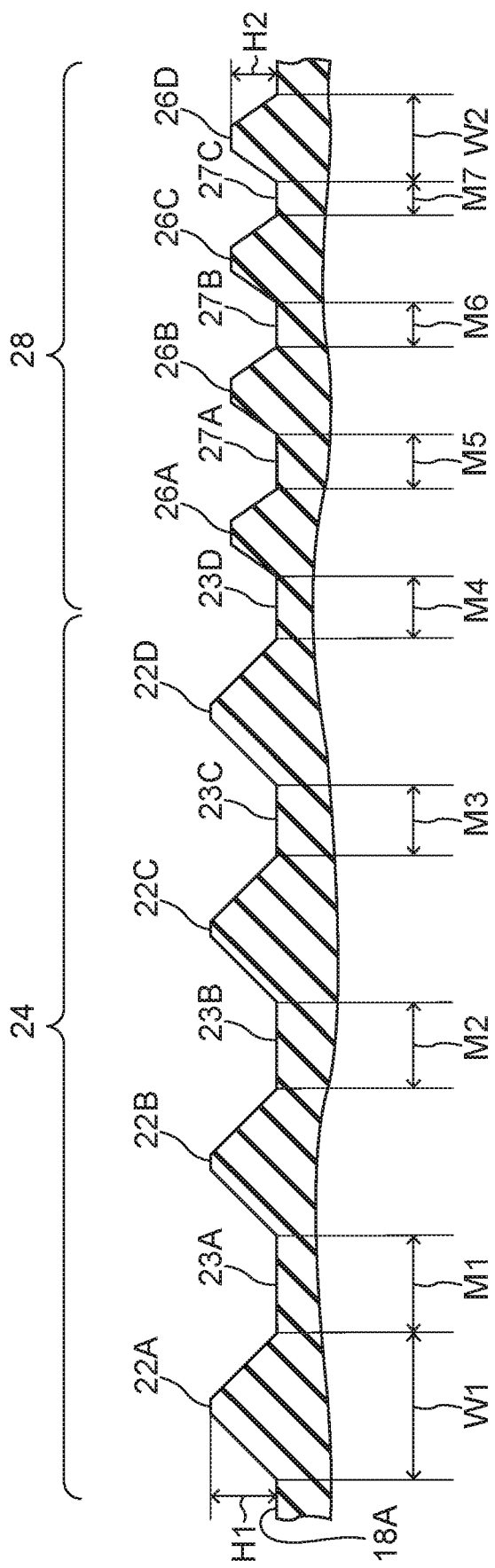

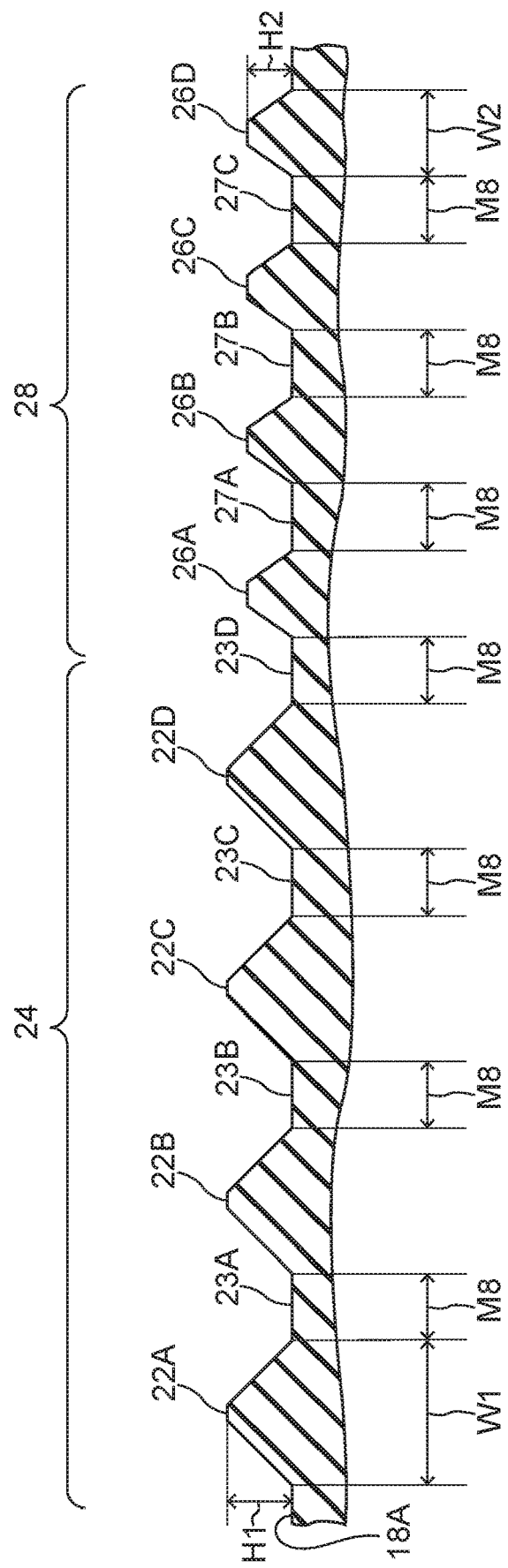

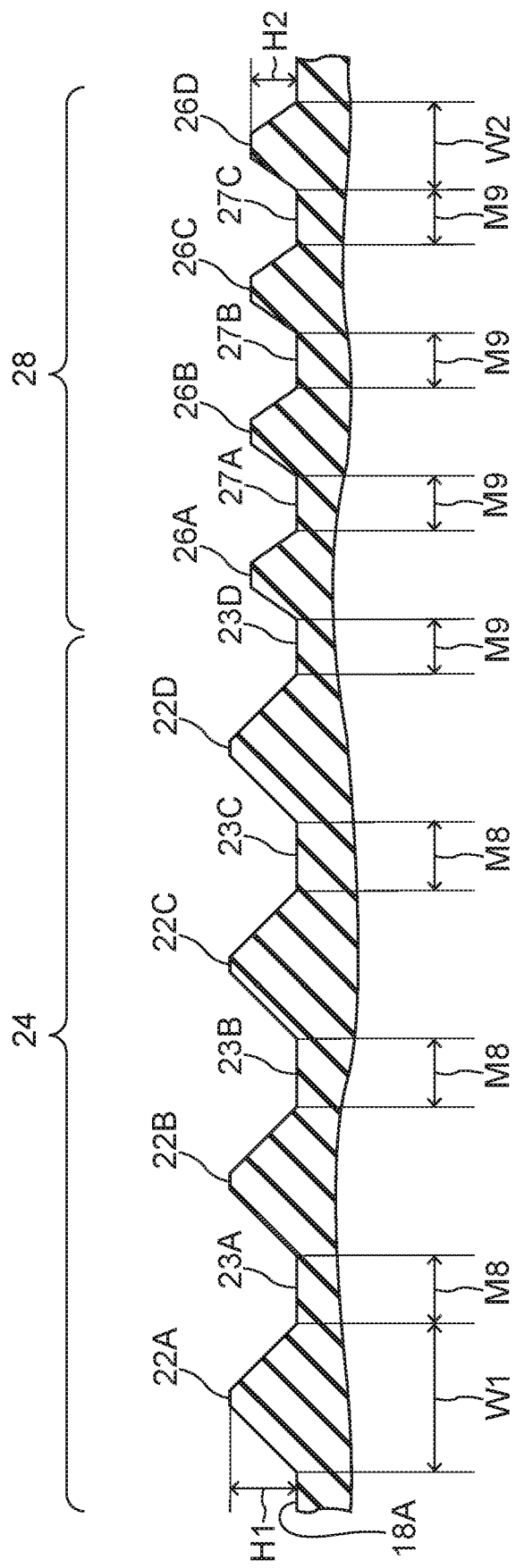

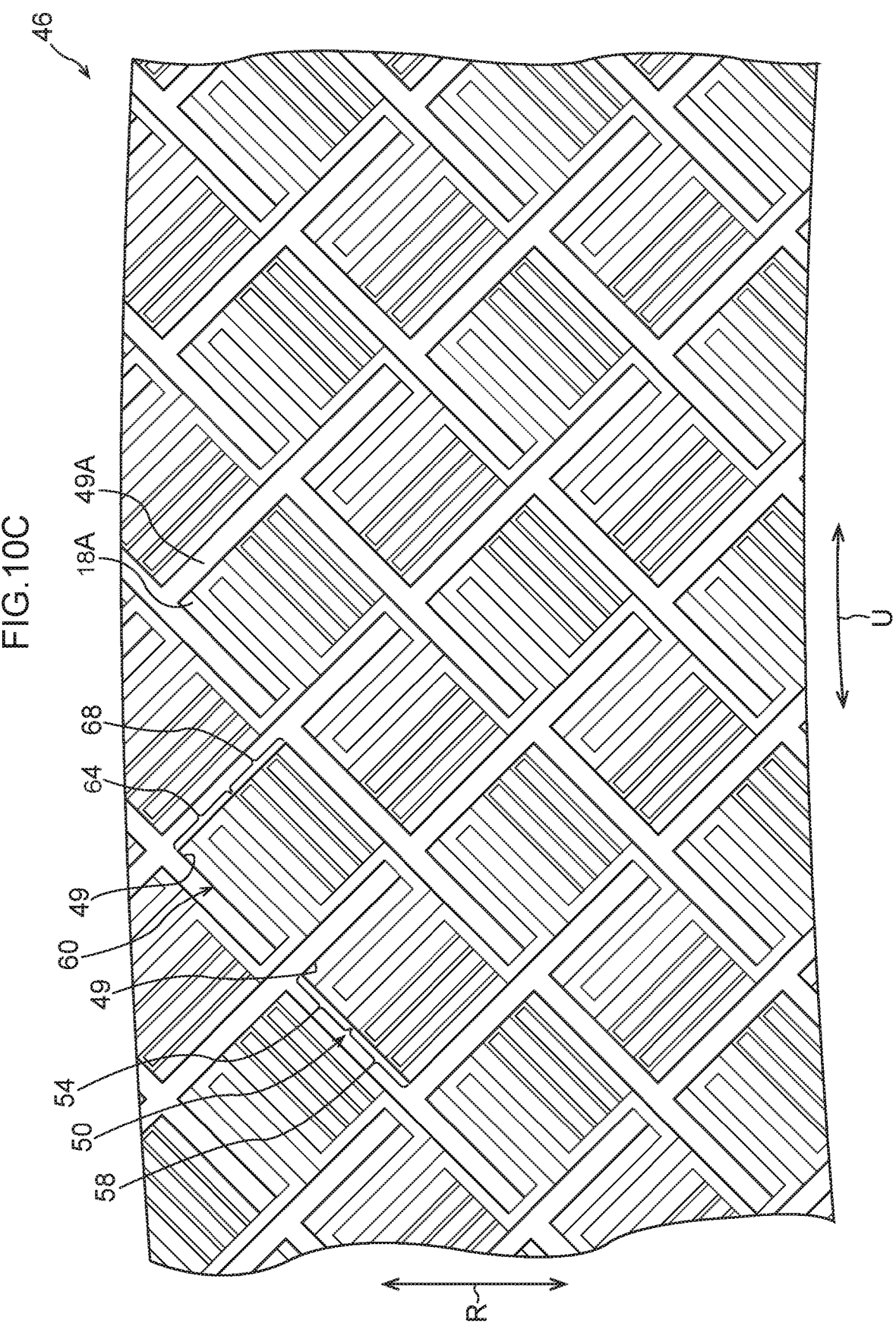

PNEUMATIC TIRE

TECHNICAL FIELD

The present invention relates to a pneumatic tire in which plural ridges are formed at a tire side portion.

BACKGROUND ART

The provision of side decorative bands, in which plural straight or curved ridges are arrayed in parallel, at the side portions of a tire has been carried out widely. Making the thickness of the tire sides thin in order to aim for decreased weight of the tire has been carried out, but, if the thickness of the tire sides is made thin, there are cases in which convexity and concavity, which is caused by the end portions of members such as the belts or the like, appears at the surfaces of the tire sides. The aforementioned side decorative belt is effective in making such convexity and concavity inconspicuous.

For example, a side decorative belt that is structured by decorative element A1, decorative element B1 and decorative element C1 is disclosed in Japanese Patent Application Laid-Open (JP-A) No. 2011-126335. By forming this side decorative belt at the tire side portion, the effect of making convexity and concavity at the side portion of the tire inconspicuous is achieved.

SUMMARY OF INVENTION

Technical Problem

Because the tire side portion can be seen also when the tire is mounted, further improvement in the external appearance is desired.

In view of the above-described circumstances, the subject of the present invention is the provision of a pneumatic tire in which convexity and concavity of a tire side portion is made to be inconspicuous, and the external appearance of the tire side portion is improved.

Solution to Problem

A pneumatic tire relating to a first aspect comprises: a first direction concave portion pattern having a main ridge region, which has a plurality of main ridges that project out from a bottom surface of a concave portion formed in an outer surface of a tire side portion and that are disposed in parallel such that an extending direction thereof is a first direction, and a sub-ridge region, which has a plurality of sub ridges that project-out from the bottom surface of the concave portion and that are disposed in parallel such that an extending direction thereof is the first direction, a light reflection pattern of the sub-ridge region being different than that of the main ridge region; and a second direction concave portion pattern having the main ridge region, at which the extending direction of the main ridges is a second direction that is different than the first direction, and the sub-ridge region, at which the extending direction of the sub-ridges is the second direction that is different than the first direction, wherein a plurality of the first direction concave portion patterns and the second direction concave portion patterns are disposed at the tire side portion so as to be lined up alternately in a form of a lattice.

At the pneumatic tire relating to the first aspect, the plural first direction concave portion patterns and second direction concave portion patterns are disposed at the tire side portion.

A main ridge region, which has plural main ridges whose respective extending directions are a first direction and that are disposed in parallel, and a sub-ridge region that has plural sub-ridges, are formed at the first direction concave portion pattern. The light reflection patterns differ at the main ridge region and the sub-ridge region.

On the other hand, the second direction concave portion pattern includes the main ridge region, at which the extending directions of the main ridges are a second direction that is different than the first direction, and the sub-ridge region, at which the extending directions of the sub-ridges are the second direction that is different than the first direction. Namely, the second direction concave portion pattern is a pattern in which the first direction concave portion pattern is rotated and disposed such that the extending directions of the main ridges and the sub-ridges become the second direction that is different than the first direction, and has main ridges and sub-ridges that are similar to those of the first direction concave portion pattern. Further, the first direction concave portion patterns and the second direction concave portion patterns are lined up alternately.

In this way, the concave portion patterns, which include the main ridge regions and the sub-ridge regions whose light reflection patterns are different, are lined up alternately with the extending directions of the ridges thereof made to differ. Due thereto, incident light can be reflected in multiple directions, and that portion can be made to look three-dimensional. Accordingly, at the tire side portion, a difference in shading that is due to the difference in the reflection of light (sunlight, ambient light, or the like) can be produced effectively.

Further, due to the concave portion patterns, which can cause the difference in shading to be exhibited in this way, being lined-up at the tire side portion, convexity and concavity of the outer surface of the tire side portion that has a relatively low spatial frequency can be made to be inconspicuous.

A pneumatic tire relating to a second aspect has the feature that a projecting height of the sub-ridges from the bottom surface is lower than a projecting height of the main ridges from the bottom surface.

By making the projecting heights of the sub-ridges and the main ridges from the bottom surface differ in this way, the reflection patterns of the light that is incident on the sub-ridge region and the main ridge region respectively can be made to differ.

A pneumatic tire relating to a third aspect has the feature that an interval between sub-ridges that are adjacent to one another is more narrow than an interval between main ridges that are adjacent to one another.

By making the interval between adjacent sub-ridges and the interval between adjacent main ridges differ in this way, the reflection patterns of the light that is incident on the sub-ridge region and the main ridge region respectively can be made to differ.

In a pneumatic tire relating to a fourth aspect, the first direction and the second direction are inclined with respect to a tire peripheral direction.

In accordance with the pneumatic tire relating to the fourth aspect, because the first direction and the second direction that are extending directions of the main ridges and the sub-ridges are inclined with respect to the tire peripheral direction, propagation of cracks that arise easily along the tire peripheral direction can be suppressed.

In a pneumatic tire relating to a fifth aspect, a plurality of the first direction concave portion patterns and the second direction concave portion patterns are disposed at the tire side portion such that the main ridge regions and the sub-ridge regions respectively extend in zigzag shapes in a direction intersecting a tire peripheral direction.

In accordance with the pneumatic tire relating to the fifth aspect, by forming the zigzag shape that is structured by the main ridge regions and the zigzag shape that is structured by the sub-ridge regions to respectively extend, incident light can be reflected effectively in multiple directions, and, at the tire side portion, the difference in shading that is due to the difference in the reflection of light can be produced more effectively. Further, because the zigzag shapes extend in a direction intersecting the tire peripheral direction, propagation of cracks that arise easily along the tire peripheral direction can be suppressed.

In a pneumatic tire relating to a sixth aspect, the main ridge region and the sub-ridge region are disposed so as to be lined-up alternately in a tire peripheral direction.

In accordance with the pneumatic tire relating to the sixth aspect, because the main ridge region and the sub-ridge region are lined-up alternately in the tire peripheral direction, these portions can more effectively be made to look three-dimensional by utilizing the difference in the light reflection patterns.

A pneumatic tire relating to a seventh aspect has the feature that a ridge interval between main ridges that are adjacent to one another and a ridge interval between sub-ridges that are adjacent to one another become more narrow from a side of the main ridge region, which side is far from the sub-ridge region, toward a side of the sub-ridge region, which side is far from the main ridge region.

In accordance with the pneumatic tire relating to the seventh aspect, the adjacent ridge interval gradually becomes more narrow from the main ridge side, which is disposed at one end at one concave portion pattern, toward the sub-ridge side that is disposed at the other end. Accordingly, the difference in shading that is due to a stepwise reflection of light can be extended, and the three-dimensional feel within the main ridge region and within the sub-ridge region can be produced more effectively.

A pneumatic tire relating to an eighth aspect has the feature that the main ridges and the sub-ridges are zigzag-shaped.

In accordance with the pneumatic tire relating to the eighth aspect, because the respective main ridges and sub-ridges are zigzag-shaped, light is reflected in multiple directions, and, due thereto, the difference in shading that is due to the difference in the reflection of light can be produced effectively.

In a pneumatic tire relating to a ninth aspect, a continuous main ridgeline, in which the main ridges are connected within the main ridge region and to main ridges of adjacent main ridge regions and which is continuous, is structured.

At the time of machining a mold for forming the main ridges, if the main ridges break-off per concave portion pattern, the need arises to carry out vertical movement of the blade for machining, each time a main ridge breaks-off. In the pneumatic tire relating to the ninth aspect, the continuous main ridgeline, in which the main ridges are connected and that is continuous from one end to the other end, is structured. Accordingly, vertical movement of the aforementioned blade is unnecessary, and grooves for the main ridges can be machined easily.

A pneumatic tire relating to a tenth aspect has the feature that a projecting height of the main ridges from the bottom surface gradually becomes lower from a side of the main ridge region, which side is far from the sub-ridge region, toward a side of the sub-ridge region, which side is far from the main ridge region.

In accordance with the pneumatic tire relating to the tenth aspect, the height of the ridges gradually becomes lower from the main ridge side, which is disposed at one end at one concave portion pattern, toward the sub-ridge side that is disposed at the other end. Accordingly, a difference in shading that is due to the stepwise reflection of light can be extended, and the three-dimensional feel within the main ridge region and within the sub-ridge region respectively can be produced more effectively.

Advantageous Effects of Invention

In accordance with the present invention, convexity and concavity of a tire side portion can be made to be inconspicuous, and the external appearance of the tire side portion can be further improved.

BRIEF DESCRIPTION OF DRAWINGS

FIG. 4 is a cross-sectional view along line 4-4 of FIG. 3.

FIG. 5A is a cross-sectional view of a modified example of the side decorative portion of the tire of the first embodiment.

FIG. 5B is a cross-sectional view of a modified example of the side decorative portion of the tire of the first embodiment.

FIG. 10C is a modified example of the side decorative portion of the second embodiment.

DESCRIPTION OF EMBODIMENTS

First Embodiment

Figure 1:
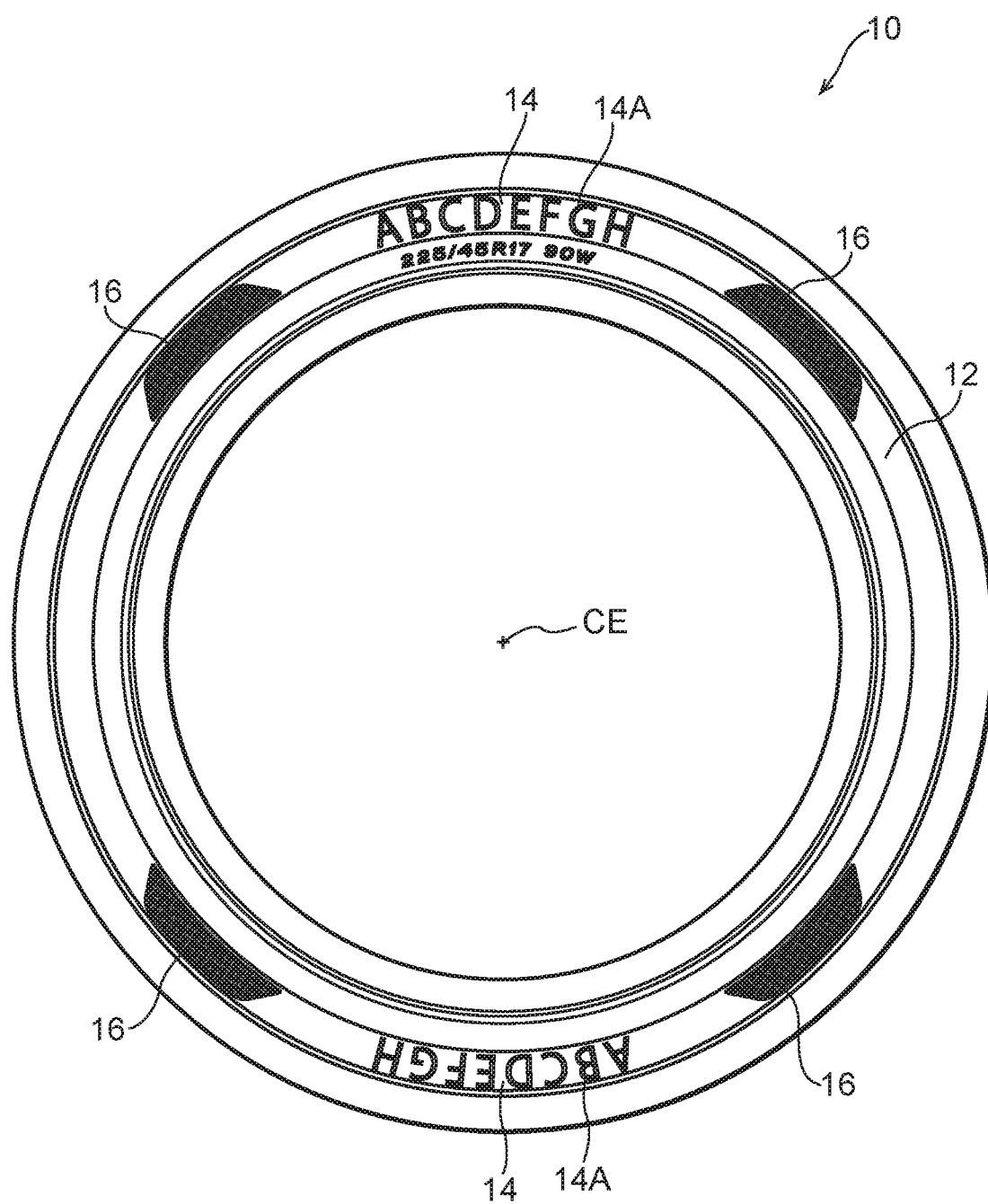
FIG. 1 is a side view of a pneumatic tire relating to a first embodiment.

A first embodiment of the present invention is described hereinafter with reference to the drawings. A side view of a pneumatic tire 10 relating to the present embodiment is shown in FIG. 1. In the present embodiment, the tire peripheral direction is indicated by U, and the tire radial direction is indicated by R.

Emblem portions 14 and side decorative bands 16 are formed at a tire side portion 12 of the pneumatic tire 10.

The emblem portions 14 are made to be band-shaped circular-arc shapes, and are formed at two places at positions that are symmetrical with respect to a tire central axis CE (see FIG. 1). An emblem 14A is disposed at the emblem portion 14. The emblem 14A is expressed by characters such as "ABCDEFGH" for example that are marked on a smooth surface.

The side decorative bands 16 are made to be circular-arc shapes that run along the tire peripheral direction U, and four thereof are formed so as to be adjacent to the respective both end portions of the emblem portions 14.

Figure 2:
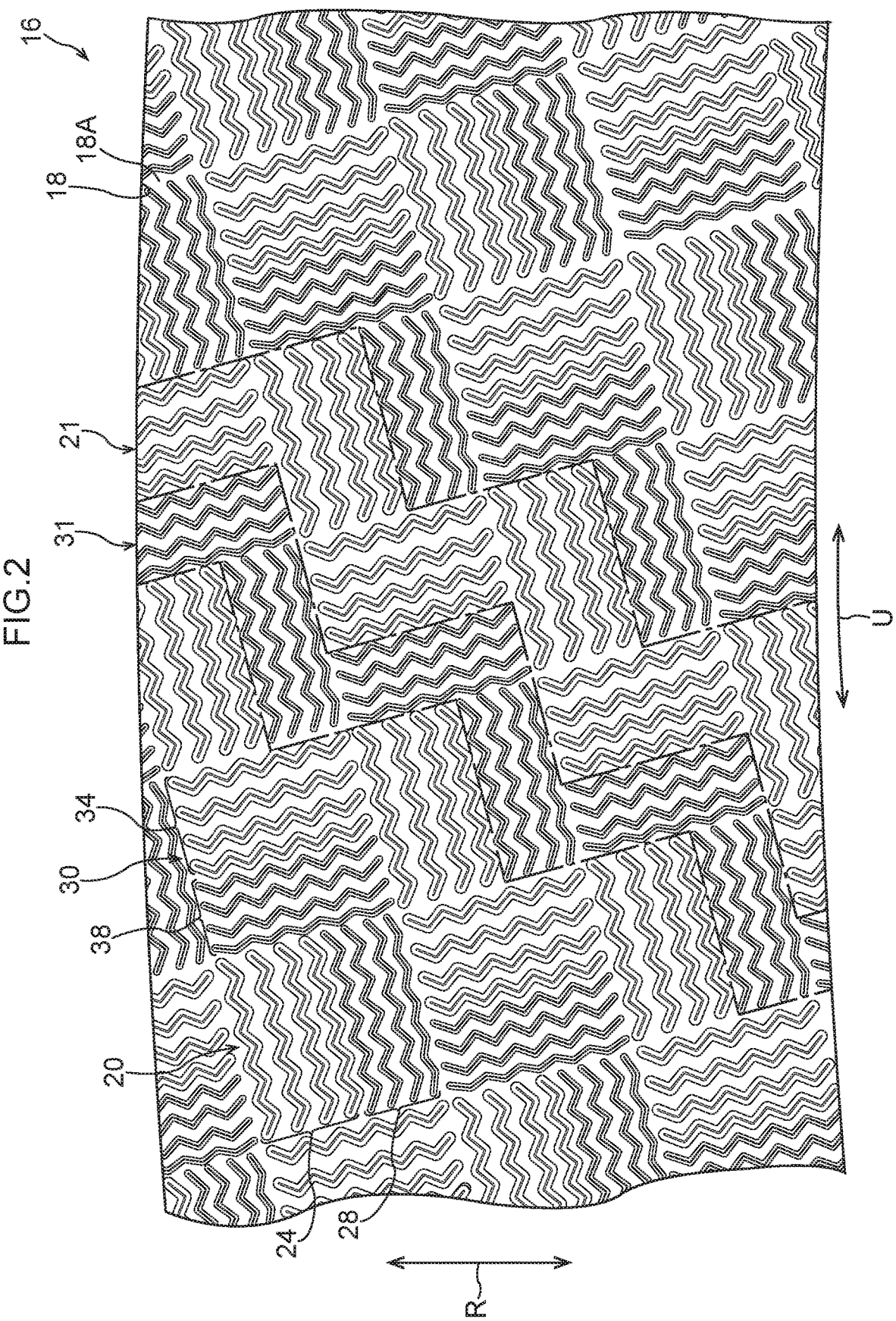
FIG. 2 is a portion of a side decorative portion of the pneumatic tire relating to the first embodiment.

As shown in FIG. 2, a decorative concave portion 18 is formed at the side decorative band 16. The decorative concave portion 18 is a shape that is recessed from the outer surface of the tire side portion 12, and structures the outer shape of the side decorative band 16. First direction ridge patterns 20 that serve as first direction concave portion patterns and second direction ridge patterns 30 that serve as second direction concave portion patterns are disposed alternately at a bottom surface 18A of the decorative concave portion 18. Both of the first direction ridge pattern 20 and the second direction ridge pattern 30 are one unit of a decorative element at which plural ridges are formed. The first direction ridge pattern 20 and the second direction ridge pattern 30 are the same shapes and only the placement angles thereof differ.

Figure 3:
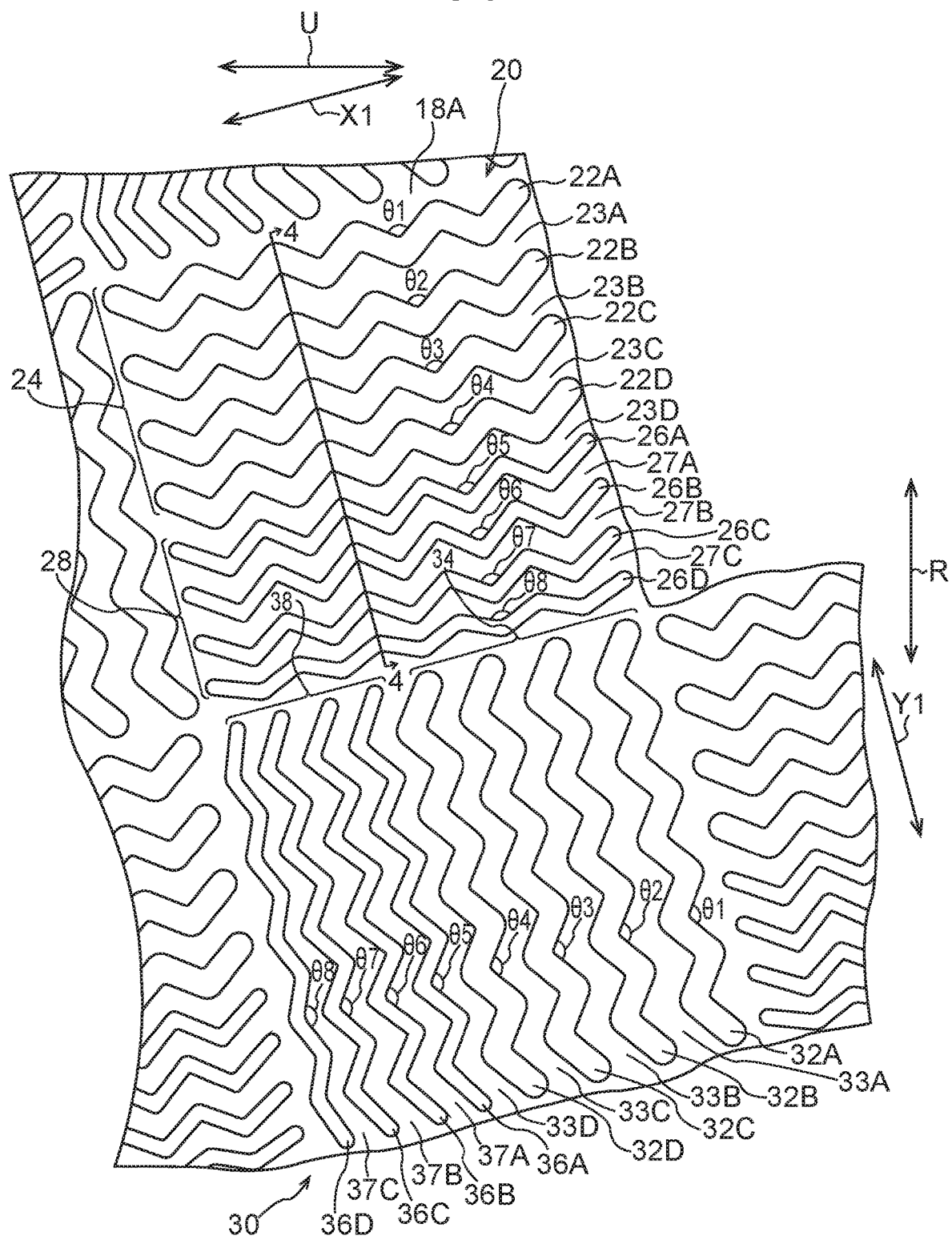
FIG. 3 is a partial, enlarged view of the side decorative portion of the pneumatic tire relating to the first embodiment.

As shown in FIG. 3, the first direction ridge pattern 20 is a substantially square shape that is recessed from the tire side portion 12, and is structured by a main ridge region 24 and a sub-ridge region 28 that are substantially rectangular. Four main ridges 22A, 22B, 22C, 22D are formed in parallel so as to be parallel to one another at the main ridge region 24. The main ridges 22A, 22B, 22C, 22D are zigzag-shaped, and extend in a first direction X1 that is slightly inclined with respect to the tire peripheral direction U. Of zigzag bending angles θ1 through θ4 of the main ridges 22A, 22B, 22C, 22D, that of the main ridge 22A is the most acute angle, and the angles widen toward the main ridge 22D side, and the main ridge 22D is the most obtuse angle. Namely, θ1<θ2<θ3<θ4.

As shown in FIG. 4, the main ridges 22A, 22B, 22C, 22D project-out at height H1 from the bottom surface 18A. The height H1 is set within the range of 0.08 to 3.0 mm. The cross-sectional shapes of the main ridges 22A, 22B, 22C, 22D are trapezoidal shapes that gradually become narrower from the bottom surface 18A. The bottom surfaces of the main ridges 22A, 22B, 22C, 22D are width W1. The width W1 is set within the range of 0.08 to 3.0 mm. Groove portion 23A of groove width M1 is structured between the main ridge 22A and the main ridge 22B, and groove portion 23B of groove width M2 is formed between the main ridge 22B and the main ridge 22C, and groove portion 23C of groove width M3 is formed between the main ridge 22C and the main ridge 22D.

As shown in FIG. 3, the sub-ridge region 28 is adjacent to the main ridge region 24. Four sub-ridges 26A, 26B, 26C, 26D are formed in parallel so as to be parallel to one another at the sub-ridge region 28. The sub-ridges 26A, 26B, 26C, 262D are zigzag-shaped, and extend in the first direction X1 that is the same direction as the main ridges 22A, 22B, 22C, 22D. Of zigzag bending angles θ5 through θ8 of the sub-ridges 26A, 26B, 26C, 26D, that of the sub-ridge 26A is the most acute angle, and the angles widen toward the sub-ridge 26D side, and the sub-ridge 26D is the most obtuse angle. Namely, θ5<θ6<θ7<θ8. The zigzag bending angle θ5 of the sub-ridge 26A is larger than the zigzag bending angle θ4 of the main ridge 22D.

As shown in FIG. 4, the sub-ridges 26A, 26B, 26C, 26D project-out from the bottom surface 18A at height H2 that is lower than the height H1. The height H2 is set within the range of 0.05 to 2.0 mm. The cross-sectional shapes of the sub-ridges 26A, 26B, 26C, 26D are trapezoidal shapes that gradually become narrower from the bottom surface 18A. The bottom surfaces of the sub-ridges 26A, 26B, 26C, 26D are width W2 that is narrower than the width W1. The width W2 is set within the range of 0.05 to 2.0 mm. Groove portion 23D of groove width M4 is formed between the main ridge 22D and the sub-ridge 26A. Groove portion 27A of groove width M5 is formed between the sub-ridge 26A and the sub-ridge 26B, and groove portion 27B of groove width M6 is formed between the sub-ridge 26B and the sub-ridge 26C, and groove portion 27C of groove width M7 is formed between the sub-ridge 26C and the sub-ridge 26D.

At the first direction ridge pattern 20, with respect to the groove widths of the groove portions that are structured between the respective ridges, the groove portion 23A is the widest, and the groove widths become more narrow in order toward the sub-ridge 26D side, and M1>M2>M3>M4>M5>M6>M7.

The second direction ridge pattern 30 has a shape that is similar to the first direction ridge pattern 20, but is disposed as if the first direction ridge pattern 20 is rotated by 90°. Main ridge region 34 and sub-ridge region 38 of the second direction ridge pattern 30 correspond respectively to the main ridge region 24 and the sub-ridge region 28 of the first direction ridge pattern 20. Main ridges 32A, 32B, 32C, 32D of the second direction ridge pattern 30 correspond to the main ridges 22A, 22B, 22C, 22D of the first direction ridge pattern 20, and sub-ridges 36A, 36B, 36C, 36D of the second direction ridge pattern 30 correspond to the sub-ridges 26A, 26B, 26C, 26D of the first direction ridge pattern 20.

Further, groove portions 33A, 33B, 33C, 33D, 37A, 37B, 37C of the second direction ridge pattern 30 correspond respectively to the groove portions 23A, 23B, 23C, 23D, 27A, 27B, 27C of the first direction ridge pattern 20. The main ridges 32A, 32B, 32C, 32D and the sub-ridges 36A, 36B, 36C, 36D extend in second direction Y1 that is inclined slightly with respect to the tire radial direction R.

The first direction ridge pattern 20 and the second direction ridge pattern 30 are disposed so as to be lined-up alternately at the bottom surface 18A of the decorative concave portion 18, and the entirety of the decorative concave portion 18 is decorated by the first direction ridge patterns 20 and the second direction ridge patterns 30. The main ridge region 24 and the main ridge region 34 of the first direction ridge pattern 20 and the second direction ridge pattern 30 that are adjacent to one another are adjacent such that the length directions thereof form a 90° angle, and form a zigzag main ridgeline 21 that is zigzag-shaped. The zigzag main ridgeline 21 extends in a direction intersecting the tire peripheral direction U.

The sub-ridge region 28 and the sub-ridge region 38 of the first direction ridge pattern 20 and the second direction ridge pattern that are adjacent to one another are adjacent so as to form a 90° angle, and form a zigzag sub-ridgeline 31 that is zigzag-shaped. The zigzag sub-ridgeline 31 extends in the same direction as the zigzag main ridgeline 21.

The zigzag main ridgeline 21 and the zigzag sub-ridgeline 31 are disposed alternately in the tire peripheral direction.

As described above, the side decorative band 16 is formed due to the first direction ridge pattern 20, which includes the main ridge region 24 and the sub-ridge region 28 at which the projecting heights of the ridges differ, and the second direction ridge pattern 30, which includes the main ridge region 34 and the sub-ridge region 38, being lined-up alternately with the extending directions of the ridges thereof differing from one another. Due thereto, incident light can be reflected in multiple directions, and the side decorative band 16 can be made to look three-dimensional, and, at the tire side portion, a difference in shading that is due to the difference in the reflection of light (sunlight, ambient light, or the like) can be produced effectively. Moreover, because the projecting heights of the ridges differ at the main ridge regions 24, 34 and the sub-ridge regions 28, 38, the three-dimensional feel of the side decorative band 16 can be produced more effectively.

Further, the side decorative band 16 has the zigzag main ridgeline 21, which is zigzag-shaped and is structured by the main ridge regions 24, 34, and the zigzag sub-ridgeline 31, which is zigzag-shaped and is structured by the sub-ridge regions 28, 38. Accordingly, incident light can be reflected effectively in more directions, and, at the tire side portion, the difference in shading that is due to the difference in the reflection of light can be produced effectively.

Further, at the side decorative band 16, the zigzag main ridgeline 21 and the zigzag sub-ridgeline 31 extend in a direction intersecting the tire peripheral direction U. Accordingly, propagation of cracks that arise easily along the tire peripheral direction U can be suppressed. Moreover, because the zigzag main ridgeline 21 and the zigzag sub-ridgeline 31 are disposed alternately in the tire peripheral direction, these portions can more effectively be made to look three-dimensional by utilizing the difference in the heights.

Further, at the first direction ridge pattern 20 and the second direction ridge pattern 30, the groove width between adjacent ridges gradually becomes more narrow from the side of the main ridge 22A, 32A toward the sub-ridge 26D, 36D side. Due thereto, an effect that is as if the heights of the ridges are changing within the main ridge region 24, 34 and within the sub-ridge region 28, 38 respectively, can be produced.

Note that, in the present embodiment, the groove widths between adjacent ridges are all varied. However, as shown in FIG. 5A, the groove portions 23A, 23B, 23C, 23D, 27A, 27B, 27C and the groove portions 33A, 33B, 33C, 33D, 37A, 37B, 37C that are not illustrated may all be made to be a same groove width M8.

Further, as shown in FIG. 5B, the groove widths of the groove portions 23A, 23B, 23C, 33A, 33B, 33C within the main ridge region 24, 34 may be made to be the same width M8, and the groove widths of the groove portions 27A, 27B, 27C, 37A, 37B, 37C within the sub-ridge region 28, 38 may be made to be a same width M9. In this case, the groove width of the groove portions within the main ridge region 24, 34 is made to be wider than the groove width of the groove portions within the sub-ridge region 28, 38.

Further, in the present embodiment, at the first direction ridge pattern 20 and the second direction ridge pattern 30, the projecting heights of the ridges are two steps, but the projecting heights may be made to be gradually shorter from the side of the main ridge 22A, 32A toward the sub-ridge 26D, 36D side.

Figure 5C:
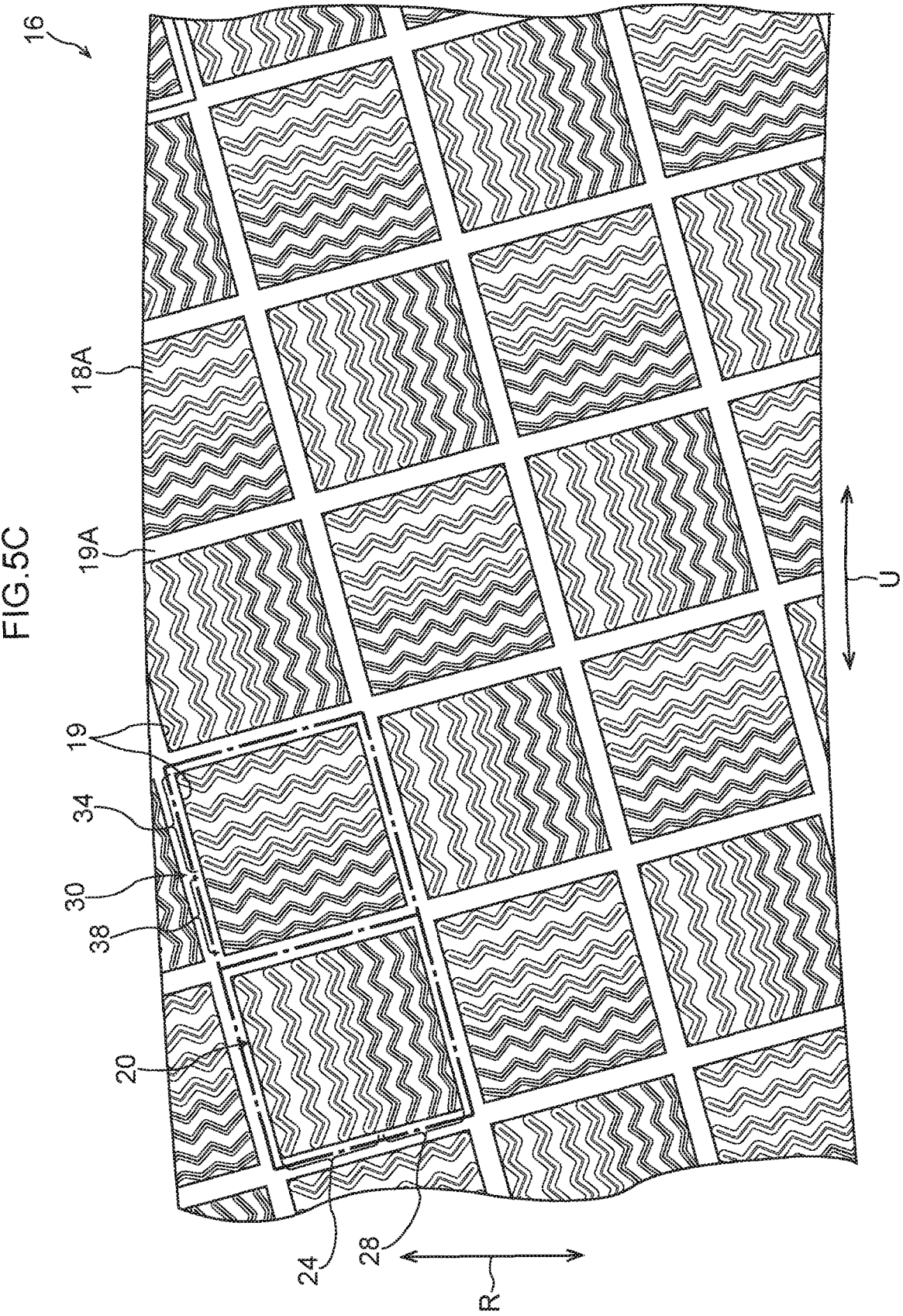
FIG. 5C is a modified example of the side decorative portion of the tire of the first embodiment.

Note that, in the present embodiment, the plural concave portions are lined-up at the decorative concave portion 18 without gaps therebetween. However, as shown in FIG. 5C, the first direction ridge patterns 20 and the second direction ridge patterns 30, which are formed in concave portions 19 with intervals therebetween, may be lined-up at the tire side portion 12 without the decorative concave portion 18. In this case, partitioning portions 19A, which are the same height as the outer surface (the general surface) of the tire side portion 12, are formed between the concave portions 19 that are adjacent to one another.

Second Embodiment

A second embodiment of the present invention is described next. In the present embodiment, portions that are similar to those of the first embodiment are denoted by the same reference numerals, and detailed description thereof is omitted.

Figure 6:
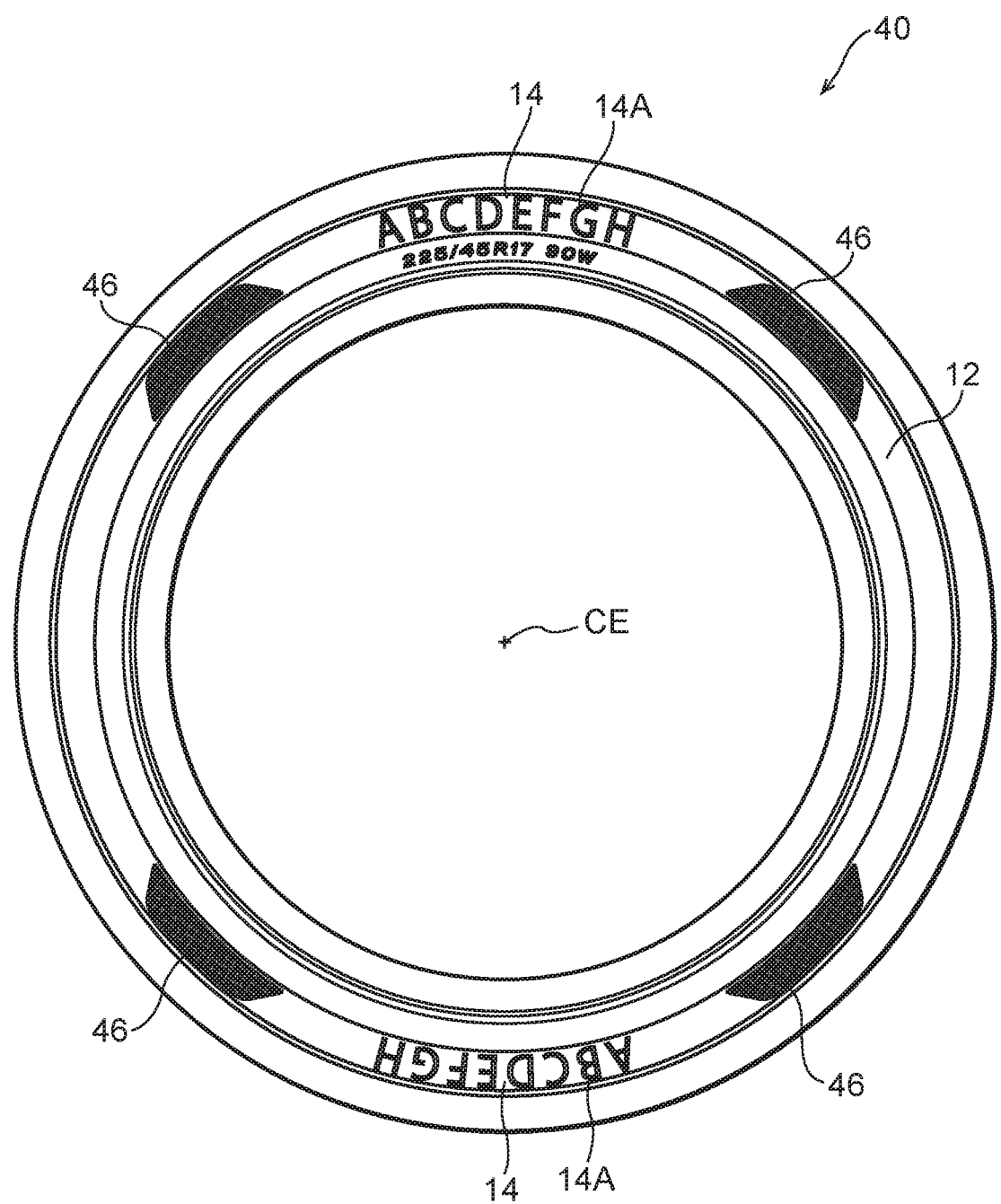
FIG. 6 is a side view of a pneumatic tire relating to a second embodiment.
Figure 7:
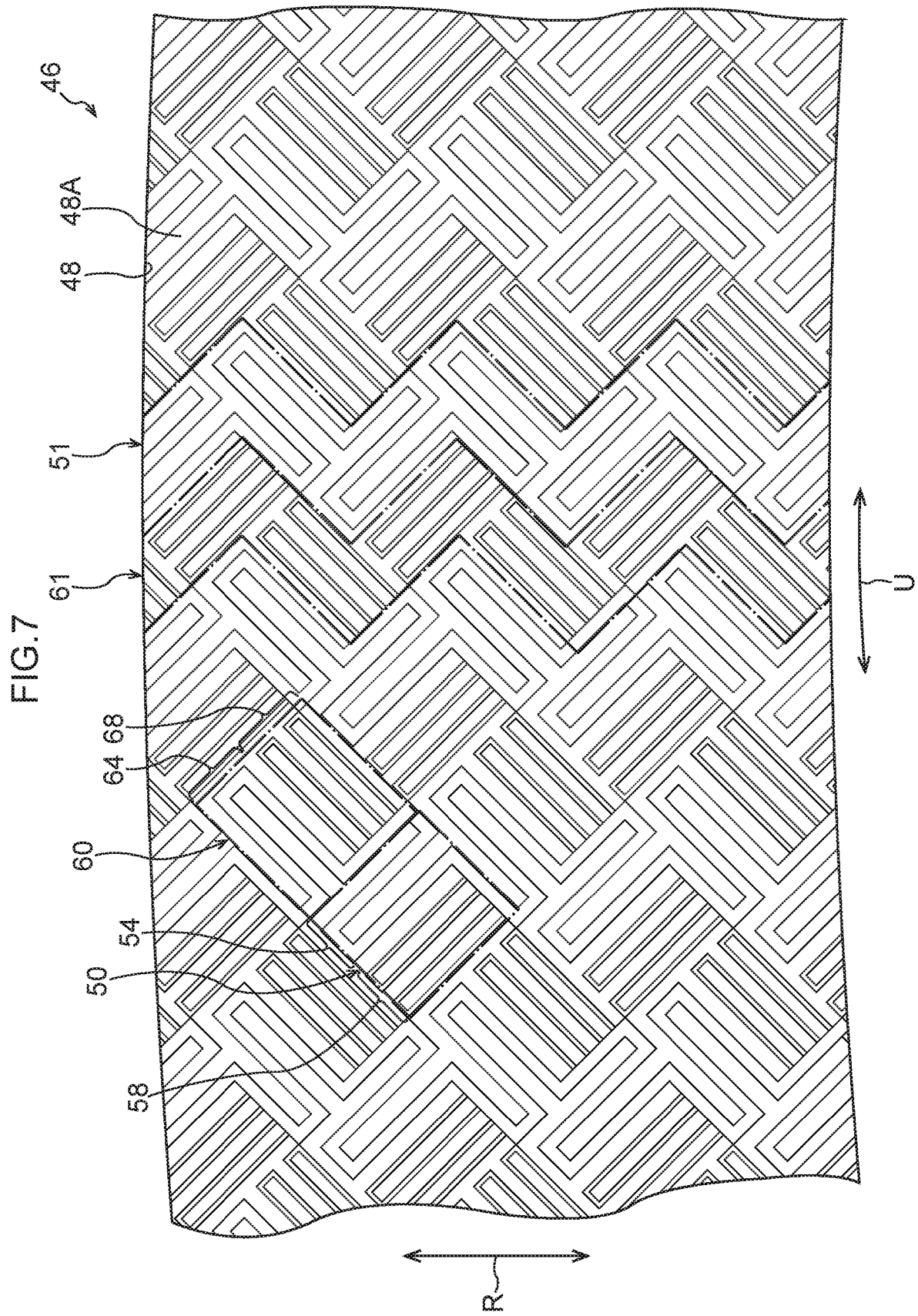
FIG. 7 is a portion of a side decorative portion of the pneumatic tire relating to the second embodiment.

As shown in FIG. 6, the emblem portions 14 and side decorative bands 46 are formed at the tire side portion 12 of a pneumatic tire 40 of the present embodiment. As shown in FIG. 7, decorative concave portions 48 are formed at the side decorative bands 46. The decorative concave portion 48 is a shape that is recessed from the outer surface of the tire side portion 12, and structures the outer shape of the side decorative band 46. At the decorative concave portion 48, plural concave portions are lined-up continuously without gaps therebetween.

Figure 8:
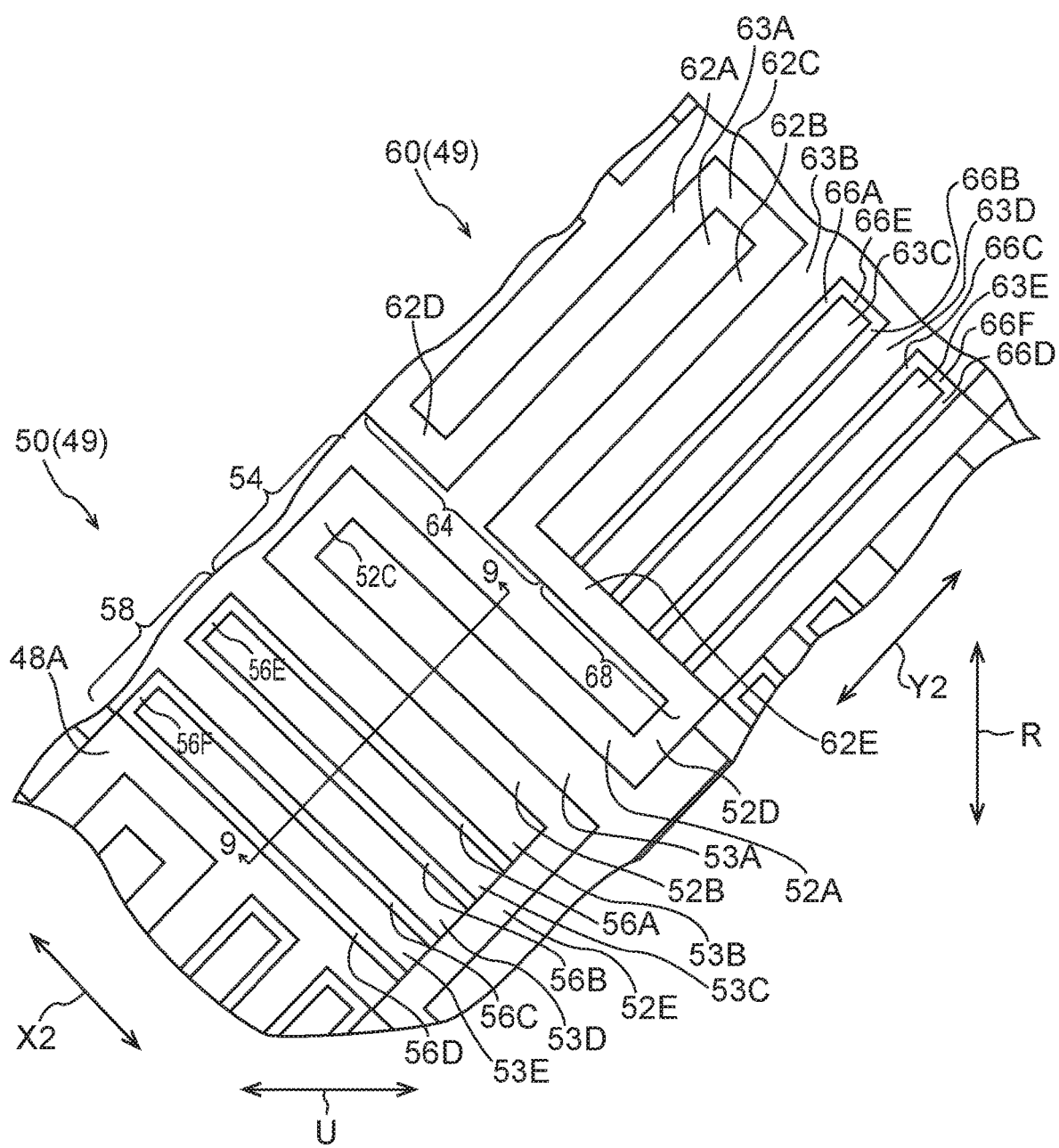
FIG. 8 is a partial, enlarged view of the side decorative portion of the pneumatic tire relating to the second embodiment.

As shown in FIG. 7, first direction ridge patterns 50 and second direction ridge patterns 60 are disposed alternately at a bottom surface 48A of the decorative concave portion 48. The first direction ridge pattern 50 is substantially square, and, as shown in FIG. 8, is structured by a main ridge region 54 and a sub-ridge region 58 that are substantially rectangular.

Figure 9:
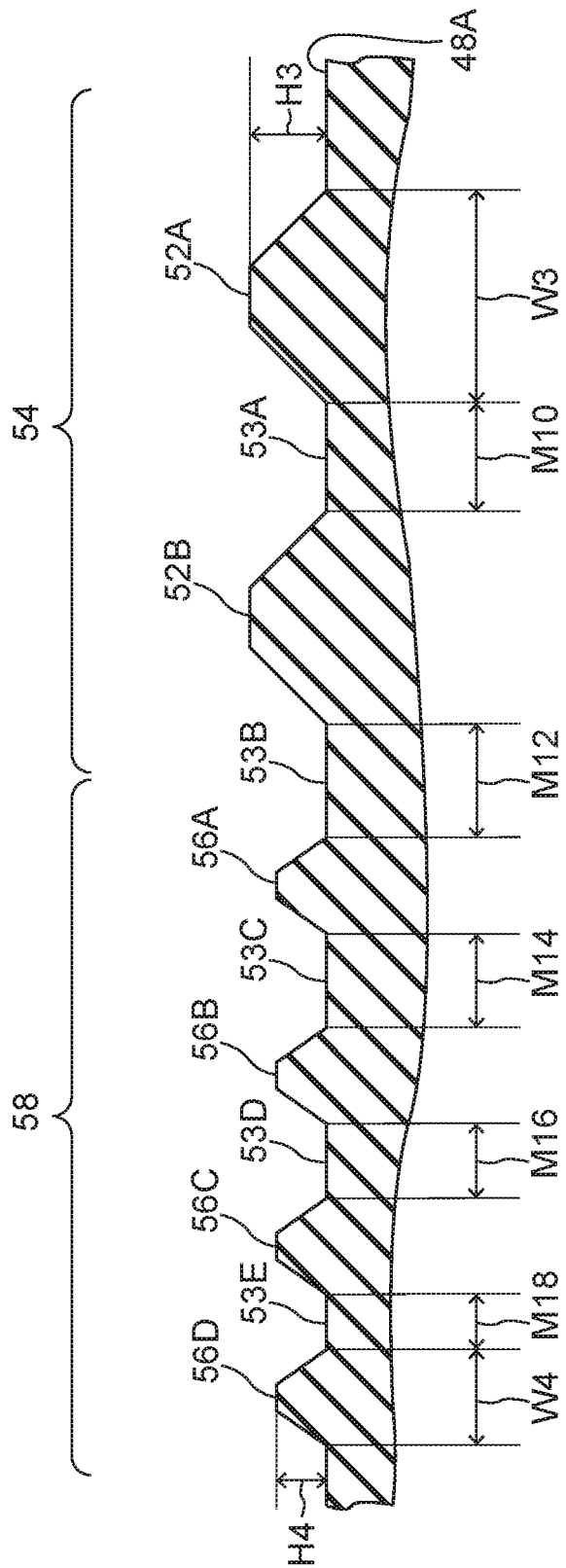
FIG. 9 is a cross-sectional view along line 9-9 of FIG. 8.

Two main ridges 52A, 52B are disposed in parallel so as to be parallel to one another at the main ridge region 54. The main ridges 52A, 52B extend in a first direction X2 that is inclined with respect to the tire peripheral direction U, and extend from one end side to the other end side of the square of the first direction ridge pattern 50. As shown in FIG. 9, the main ridges 52A, 52B project-out from the bottom surface 48A at height H3. The height H3 is set within the range of 0.08 to 3.0 mm.

One end side of the main ridge 52A and one end side of the main ridge 52B are connected by an end portion ridge 52C. In the same way as the main ridges 52A, 52B, the end portion ridge 52C projects-out from the bottom surface 48A at the height H3. The end portion ridge 52C extends from one end side of the main ridge 52A to one end side of the main ridge 52B, in the direction orthogonal to the first direction X2. A substantially U-shaped ridge, which extends from another end side to one end side of the first direction ridge pattern 50 and is bent-back at the one end side and returns to the other end side, is formed by the main ridges 52A, 52B and the end portion ridge 52C.

A short connecting ridge 52D is formed at the other end side of the main ridge 52A. The short connecting ridge 52D is bent at a substantial right angle from the other end of the main ridge 52A toward the side opposite the main ridge 52B, and is formed to the corner portion of the first direction ridge pattern 50. A long connecting ridge 52E is formed at the other end side of the main ridge 52B. The long connecting ridge 52E is bent at a substantial right angle from the other end of the main ridge 52B toward the side opposite the main ridge 52A, and is formed to the corner portion of the first direction ridge pattern 50.

The cross-sectional shapes of the main ridges 52A, 52B, the end portion ridge 52C, the short connecting ridge 52D and the long connecting ridge 52E are trapezoidal shapes that gradually become narrower from the bottom surface 48A, and the bottom surfaces thereof are width W3. The width W3 is set within the range of 0.08 to 3.0 mm.

At the sub-ridge region 58, four sub-ridges 56A, 56B, 56C, 56D are formed in parallel so as to be parallel to one another. The sub-ridges 56A, 56B, 56C, 56D project-out from the bottom surface 48A at height H4 that is lower than the height H3, and extend in the first direction X2. Further, the other ends thereof are connected to the long connecting ridge 52E, and the one ends thereof extend to the other end side of the square of the first direction ridge pattern 50. The height H4 is set within the range of 0.05 to 2.0 mm.

One end side of the sub-ridge 56A and one end side of the sub-ridge 56B are connected by an end portion ridge 56E, and one end side of the sub-ridge 56C and one end side of the sub-ridge 56D are connected by an end portion ridge 56F. The end portion ridges 56E, 56F are disposed in the direction orthogonal to the first direction X2. Substantially U-shaped ridges, which extend from the long connecting ridge 52E of the first direction ridge pattern 50 to the one end side and are bent-back at the one end side and return to the long connecting ridge 52E, are formed by the sub-ridges 56A, 56B and the end portion ridge 56E, and the sub-ridges 56C, 56D and the end portion ridge 56F, respectively.

As shown in FIG. 9, the sub-ridges 56A, 56B, 56C, 56D and the end portion ridges 56E, 56F are trapezoidal shapes that gradually become narrower from the bottom surface 48A, and the bottom surfaces are width W4. The width W4 is set within the range of 0.05 to 2.0 mm.

A groove portion 53A of groove width M10 is structured between the main ridge 52A and the main ridge 52B, and a groove portion 53B of groove width M12 is formed between the main ridge 52B and the sub-ridge 56A. A groove portion 53C of groove width M14 is formed between the sub-ridge 56A and the sub-ridge 56B, and a groove portion 53D of groove width M16 is formed between the sub-ridge 56B and the sub-ridge 56C, and a groove portion 53E of groove width M18 is formed between the sub-ridge 56C and the sub-ridge 56D. With respect to the groove widths of these groove portions, the groove portion 53A is the widest, and the groove widths become more narrow in order toward the sub-ridge 56D side, and M10>M12>M14>M16>M18.

The second direction ridge pattern 60 has a shape that is similar to the first direction ridge pattern 50, but is disposed as if the first direction ridge pattern 50 is rotated by 90°. Main ridge region 64 and sub-ridge region 68 of the second direction ridge pattern 60 correspond respectively to the main ridge region 54 and the sub-ridge region 58 of the first direction ridge pattern 50. Main ridges 62A, 62B, an end portion ridge 62C, a short connecting ridge 62D and a long connecting ridge 62E of the second direction ridge pattern 60 correspond to the main ridges 52A, 52B, the end portion ridge 52C, the short connecting ridge 52D and the long connecting ridge 52E of the first direction ridge pattern 50. Further, sub-ridges 66A, 66B, 66C, 66D and end portion ridges 66E, 66F of the second direction ridge pattern 60 correspond to the sub-ridges 56A, 56B, 56C, 56D and the end portion ridges 56E, 56F of the first direction ridge pattern 50. The main ridges 62A, 62B and the sub-ridges 66A, 66B, 66C, 66D extend in a second direction Y2 that is slightly inclined with respect to the tire radial direction R. A groove portion 63A, a groove portion 63B, a groove portion 63C, a groove portion 63D, a groove portion 63E of the second direction ridge pattern 60 correspond to the groove portion 53A, the groove portion 53B, the groove portion 53C, the groove portion 53D, the groove portion 53E of the first direction ridge pattern 50.

The first direction ridge patterns 50 and the second direction ridge patterns 60 are disposed so as to be lined-up alternately at the bottom surface 48A of the decorative concave portion 48, and the entire decorative concave portion 48 is decorated by the first direction ridge patterns 50 and the second direction ridge patterns 60. The short connecting ridge 52D and the long connecting ridge 62E, and the long connecting ridge 52E and the short connecting ridge 62D, of the first direction ridge pattern 50 and the second direction ridge pattern 60 that are adjacent to one another are connected together. Due thereto, ridges of the heights H3, H4 are connected as one ridge from the one end to the other end of the decorative concave portion 48, and a continuous main ridgeline 51 that is zigzag-shaped is formed. The continuous main ridgeline 51 extends in a direction intersecting the tire peripheral direction.

Further, the sub-ridges 56A, 56B and the sub-ridges 66A, 66B of the first direction ridge pattern 50 and the second direction ridge pattern 60 that are adjacent to one another form a 90° angle and are adjacent, and form a zigzag sub-ridgeline 61 that is zigzag-shaped. The zigzag sub-ridgeline 61 extends in the same direction as the continuous main ridgeline 51.

The continuous main ridgeline 51 and the zigzag sub-ridgeline 61 are disposed alternately in the tire peripheral direction.

As described above, the side decorative band 46 is formed due to the first direction ridge pattern 50, which includes the main ridge region 54 and the sub-ridge region 58 at which the intervals between the ridges differ, and the second direction ridge pattern 60, which includes the main ridge region 64 and the sub-ridge region 68, being lined-up alternately with the extending directions of the ridges thereof differing from one another. Due thereto, incident light can be reflected in multiple directions, and, due to the visual effect that is caused by the sparseness or density of the ridges, the side decorative band 46 can be made to look three-dimensional, and, at the tire side portion, the difference in shading that is due to the difference in the reflection of light (sunlight, ambient light, or the like) can be produced effectively. Moreover, because the projecting heights of the ridges differ at the main ridge region 54, 64 and at the sub-ridge region 58, 68, the three-dimensional feel of the side decorative band 46 can be produced more effectively.

Further, the side decorative band 46 has the continuous main ridgeline 51, which is zigzag-shaped and is structured by the main ridge regions 54, 64, and the zigzag sub-ridgeline 61, which is zigzag-shaped and is structured by the sub-ridge regions 58, 68. Accordingly, incident light can be reflected effectively in more directions, and, at the tire side portion, the difference in shading that is due to the difference in the reflection of light can be produced effectively.

Further, the continuous main ridgeline 51 is continuous as one ridgeline from the one end to the other end of the decorative concave portion 48. At the time of machining a mold for forming the main ridges 52A, 52B, 62A, 62B, if the main ridges 52A, 52B, 62A, 62B break-off per ridge pattern, the need arises to carry out vertical movement of the blade for machining, each time a ridge breaks-off. In the present embodiment, the continuous main ridgeline 51, in which the main ridges 52A, 52B, 62A, 62B are connected and that is continuous from one end to the other end of the decorative concave portion, is formed. Accordingly, vertical movement of the aforementioned blade is unnecessary, and grooves for the main ridges can be machined easily.

Further, at the side decorative band 46, the continuous main ridgeline 51 and the zigzag sub-ridgeline 61 extend in a direction intersecting the tire peripheral direction U. Accordingly, propagation of cracks that arise easily along the tire peripheral direction U can be suppressed. Moreover, because the continuous main ridgeline 51 and the zigzag sub-ridgeline 61 are disposed alternately in the tire peripheral direction, these portions can more effectively be made to look three-dimensional by utilizing the difference in the heights.

Further, at the first direction ridge pattern 50 and the second direction ridge pattern 60, the groove width between adjacent ridges gradually becomes more narrow from the side of the main ridge 52A, 62A toward the sub-ridge 56D, 66D side. Due thereto, an effect that is as if the heights of the ridges are changing within the main ridge region 54, 64 and within the sub-ridge region 58, 68 respectively, can be produced.

Figure 10A:
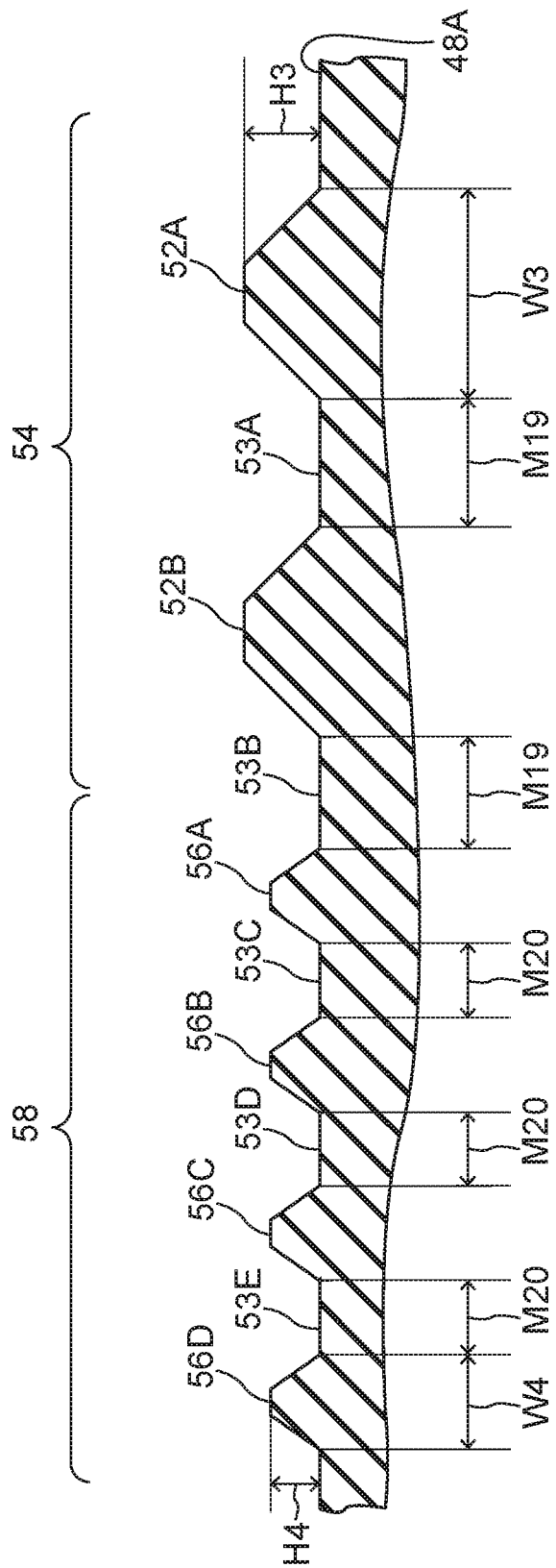
FIG. 10A is a cross-sectional view of a modified example of the side decorative portion of the second embodiment.

Note that, in the present embodiment, the groove widths of the groove portions 53A through 53E, which are formed between the main ridge 52A through the sub-ridge 56D and the main ridge 62A through the sub-ridge 66D, are varied. However, as shown in FIG. 10A, the groove widths M10 through M18 may be such that the groove widths of the groove portions 53A, 53B within the main ridge region 54, 64 are a same width M19, and the groove widths of the groove portions 53D, 53E within the sub-ridge region 58, 68 are a same width M20. In this case, the groove width M19 of the groove portions 53A, 53B within the main ridge region 54, 64 is made to be wider than the groove width M20 of the groove portions 53C through 53E within the sub-ridge region 58, 68.

Figure 10B:
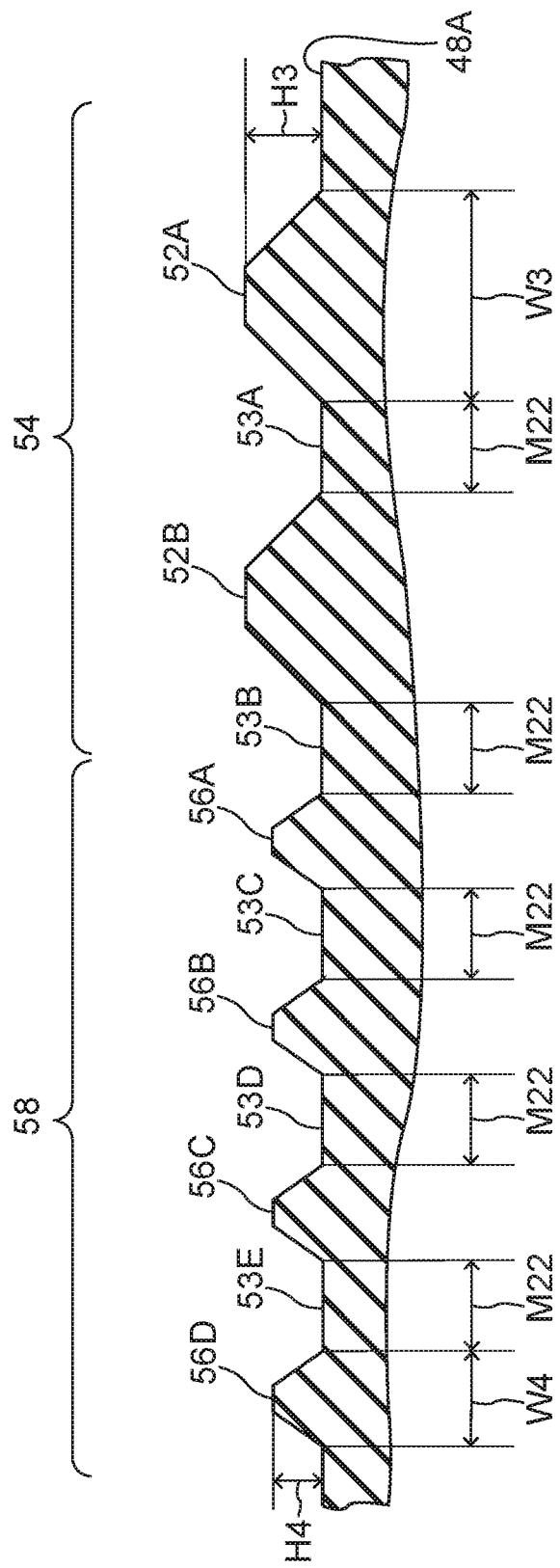
FIG. 10B is a cross-sectional view of a modified example of the side decorative portion of the second embodiment.

Further, in the present embodiment, the groove widths of the groove portions 53A through 53E are varied, but, as shown in FIG. 10(B), may all be made to be a same width M22.

Further, in the present embodiment, at the first direction ridge pattern 50 and the second direction ridge pattern 60, the projecting heights of the ridges are two steps, but the projecting heights may be made to be gradually shorter from the side of the main ridge 22A, 62A toward the sub-ridge 56D, 66C side.

Further, the heights of the main ridges 52A through 52B and 62A through 62B, and the heights of the sub-ridges 56A through 56D and 66A through 66D, may all be made to be the same height.

Note that, in the present embodiment, the plural concave portions are lined-up at the decorative concave portion 48 without gaps therebetween. However, as shown in FIG. 10C, concave portions 49 may be lined-up at the tire side portion 12 with intervals therebetween, without the decorative concave portion 48. In this case, partitioning portions 49A, which are the same height as the outer surface (the general surface) of the tire side portion 12, are formed between the unit decorative concave portions 49 that are adjacent to one another. Further, connecting portions 19B are formed at the partitioning portions 49A so as to make the main ridges continuous with one another.

The disclosures of Japanese Applications: Patent Application No. 2014-218553 and Patent Application No. 2014-218554 are, in their entireties, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A pneumatic tire comprising:
   a first direction concave portion pattern having a first main ridge region, which has a plurality of first main ridges that project out from a bottom surface of a concave portion formed in an outer surface of a tire side portion and that are disposed in parallel such that an extending direction thereof is a first direction, and a first sub-ridge region, which has a plurality of first sub-ridges that project out from the bottom surface of the concave portion and that are disposed in parallel such that an extending direction thereof is the first direction, a light reflection pattern of the first sub-ridge region being different than that of the first main ridge region; and
   a second direction concave portion pattern having a second main ridge region, which has a plurality of second main ridges that project out from a bottom surface of a concave portion formed in an outer surface of a tire side portion and that are disposed in parallel such that an extending direction thereof is a second direction, and a second sub-ridge region, which has a plurality of second sub-ridges that project out from the bottom surface of the concave portion and that are disposed in parallel such that an extending direction thereof is the second direction, a light reflection pattern of the second sub-ridge region being different than that of the second main ridge region;
   wherein the first direction and second direction are different from one another;
   wherein a plurality of the first direction concave portion patterns and the second direction concave portion patterns are disposed at the tire side portion so as to be lined up alternately in a form of a lattice, and
   wherein a projecting height of the first sub-ridges from the bottom surface are lower than a projecting height of the first main ridges from the bottom surface, and a projecting height of the second sub-ridges from the bottom surface are lower than a projecting height of the second main ridges from the bottom surface.

2. The pneumatic tire of claim 1, wherein the first direction and the second direction are inclined with respect to a tire peripheral direction.

3. The pneumatic tire of claim 1, wherein a plurality of the first direction concave portion patterns and the second direction concave portion patterns are disposed at the tire side portion such that the first main ridge regions and the second main ridge regions extend in a zigzag shape in a direction intersecting a tire peripheral direction, and the first sub-ridge regions and the second sub-ridge regions extend in a zigzag shape in a direction intersecting a tire peripheral direction.

4. The pneumatic tire of claim 1, wherein the first main ridge region and the first sub-ridge region are disposed so as to be lined up alternately in a tire peripheral direction, and the second main ridge region and the second sub-ridge region are disposed so as to be lined up alternately in a tire peripheral direction.

5. The pneumatic tire of claim 1, wherein a ridge interval between first main ridges that are adjacent to one another and a ridge interval between first sub-ridges that are adjacent to one another become more narrow from a side of the first main ridge region, which side is far from the first sub-ridge region, toward a side of the first sub-ridge region, which side is far from the first main ridge region, and wherein a ridge interval between second main ridges that are adjacent to one another and a ridge interval between second sub-ridges that are adjacent to one another become more narrow from a side of the second main ridge region, which side is far from the second sub-ridge region, toward a side of the second sub-ridge region, which side is far from the second main ridge region.

6. The pneumatic tire of claim 1, wherein the first main ridges and the first sub-ridges are zigzag-shaped, and the second main ridges and the second sub-ridges are zigzag-shaped.

7. The pneumatic tire of claim 1, wherein a continuous main ridgeline, in which the first main ridges are connected within the first main ridge region and to second main ridges of adjacent second main ridge regions and which is continuous, is structured.

8. The pneumatic tire of claim 1,
wherein a projecting height of the first main ridges from the bottom surface gradually becomes lower from a side of the first main ridge region, which side is far from the first sub-ridge region, toward a side of the first sub-ridge region, which side is far from the first main ridge region, and
wherein a projecting height of the second main ridges from the bottom surface gradually becomes lower from a side of the second main ridge region, which side is far from the second sub-ridge region, toward a side of the second sub-ridge region, which side is far from the second main ridge region.

9. A pneumatic tire comprising:
a first direction concave portion pattern having a first main ridge region, which has a plurality of first main ridges that project out from a bottom surface of a concave portion formed in an outer surface of a tire side portion and that are disposed in parallel such that an extending direction thereof is a first direction, and a first sub-ridge region, which has a plurality of first sub-ridges that project out from the bottom surface of the concave portion and that are disposed in parallel such that an extending direction thereof is the first direction, a light reflection pattern of the first sub-ridge region being different than that of the first main ridge region; and a second direction concave portion pattern having a second main ridge region, which has a plurality of second main ridges that project out from a bottom surface of a concave portion formed in an outer surface of a tire side portion and that are disposed in parallel such that an extending direction thereof is a second direction, and a second sub-ridge region, which has a plurality of second sub-ridges that project out from the bottom surface of the concave portion and that are disposed in parallel such that an extending direction thereof is the second direction, a light reflection pattern of the second sub-ridge region being different than that of the second main ridge region;

wherein the first direction and second direction are different from one another;

wherein a plurality of the first direction concave portion patterns and the second direction concave portion patterns are disposed at the tire side portion so as to be lined up alternately in a form of a lattice, and wherein an interval between first sub-ridges that are adjacent to one another is more narrow than an interval between first main ridges that are adjacent to one another, and an interval between second sub-ridges that are adjacent to one another is more narrow than an interval between second main ridges that are adjacent to one another.

* * * * *